United States Patent [19]

Smith

[11] Patent Number: 4,850,036

[45] Date of Patent: Jul. 18, 1989

[54] RADIO COMMUNICATION SYSTEM USING SYNCHRONOUS FREQUENCY HOPPING TRANSMISSIONS

[75] Inventor: James W. Smith, Middletown, N.J.

[73] Assignees: American Telephone and Telegraph Company, New York, N.Y.; AT&T Information Systems Inc., Morristown, N.J.

[21] Appl. No.: 87,726

[22] Filed: Aug. 21, 1987

[51] Int. Cl.⁴ .......................................... H04B 11/16
[52] U.S. Cl. ...................................... 455/179; 455/31; 455/51; 455/161; 455/166; 375/1; 375/115
[58] Field of Search ............... 455/161, 166, 171, 179, 455/51, 31, 33, 68; 375/1, 115; 370/107

[56] References Cited

U.S. PATENT DOCUMENTS

| | | | |
|---|---|---|---|
| 4,023,103 | 5/1977 | Malm | 325/58 |
| 4,066,964 | 1/1978 | Costanza et al. | 325/55 |
| 4,222,115 | 9/1980 | Cooper et al. | 455/33 |
| 4,479,226 | 10/1984 | Prabhu et al. | 455/33 |
| 4,554,668 | 11/1985 | Deman et al. | 375/1 |

OTHER PUBLICATIONS

G. R. Cooper and R. W. Nettleton, "A Spread-Spectrum Technique for High-Capacity Mobile Communications", *IEEE Transactions on Vehicular Technology*, vol. VT-27, No. 4, Nov. 1978, pp. 264-275.

G. Einarsson, "Address Assignment for a Time--Frequency-Coded, Spread-Spectrum System", *The Bell System Technical Journal*, Sep. 1980, pp. 1241-1255.

*Primary Examiner*—John W. Caldwell, Sr.
*Assistant Examiner*—Tyrone Queen
*Attorney, Agent, or Firm*—John A. Caccuro

[57] ABSTRACT

A frequency-hopping radio communication system is disclosed comprising a control unit which transmits to and receives from each of a plurality of slave stations using a frequency-hopping mode of operation. During a start-up mode, the control unit communicates a starting message to each slave station using a predefined frequency. The message identifies to each slave station a frequency-hopping sequence to be used to select the frequencies from a group of frequencies for transmission to and reception from the control unit. This message also specifies to each slave station unique starting frequencies in the frequency-hopping sequence at which to begin transmitting and receiving. All slave station transmissions are synchronized to the control unit transmissions, thereby preventing any two stations from concurrently using the same frequencies for either transmitting to or receiving from the control unit.

17 Claims, 6 Drawing Sheets

FIG. 7

# RADIO COMMUNICATION SYSTEM USING SYNCHRONOUS FREQUENCY HOPPING TRANSMISSIONS

RELATED APPLICATION

Related subject matter is disclosed in the following application filed concurrently herewith and assigned to the same Assignee hereof: U.S. patent application Ser. No. 087,725 entitled "Radio Communication System Having Autonomously Selected Transmission Frequencies", inventor J. W. Smith.

TECHNICAL FIELD

This invention relates to a method and apparatus for synchronously operating a radio communication system which utilizes a frequency hopping mode of frequency transmission.

BACKGROUND OF THE INVENTION

The FCC has recently made the 902–928 MHz band and two higher frequency bands available under Part 15 rules for low-power communications devices with the proviso that spread-spectrum (SS) modulation be used. One SS technique permitted is frequency hopping in which information is sent using a sequence of carrier frequencies that change at set times to produce a narrow band signal that bounces around in center frequency over the available spectrum. The FCC specified that at least 75 hopping frequencies, separated by at least 25 kHz, must be used for each communication channel and the average time of occupancy on any frequency must not be greater than 0.4 seconds within a 30-second period.

Since the 902–928 MHz band contains only 1,040 frequency bands of 25 kHz each, only six simultaneous, independent, two-way links (2 channels) could be supported without interference among the channels. This is because each channel requires at least 75 of the 25 kHz frequency bands for its frequency hopping transmission. A problem arises in applications where a communication system requires more than six communication links in a small geographic area. While directional antennas may be utilized to isolate groups of stations using the same frequencies, interference may still result.

SUMMARY OF THE INVENTION

In accordance with the present invention, the foregoing problem is solved using the apparatus of the disclosed frequency-hopping radio communication system. The system comprises a control unit which transmits to and receives from each of a plurality of stations using a first group of hopping frequencies. During a start-up mode, the control unit communicates a starting message to each slave station using a unique preassigned frequency selected from a second (start-up) group of frequencies. This message identifies to each slave station a unique transmitting and receiving starting frequency. The message also identifies to each slave station a frequency-hopping sequence to be used to select the frequencies from the frequency group for transmission to and reception from the control unit. This ensures that none of the stations use the same frequencies at the same time for transmission to and reception from the control unit. Since all the control unit transmitters are locked to a common clock and all of the stations are locked to the control unit transmissions, all transmitters at the control unit and stations hop in synchronism.

DETAILED DESCRIPTION

In the following description, each item of each figure has a reference designation associated therewith, the first number of which refers to the figure in which that item is first located (e.g., 110 is located in FIG. 1).

Figure 1:
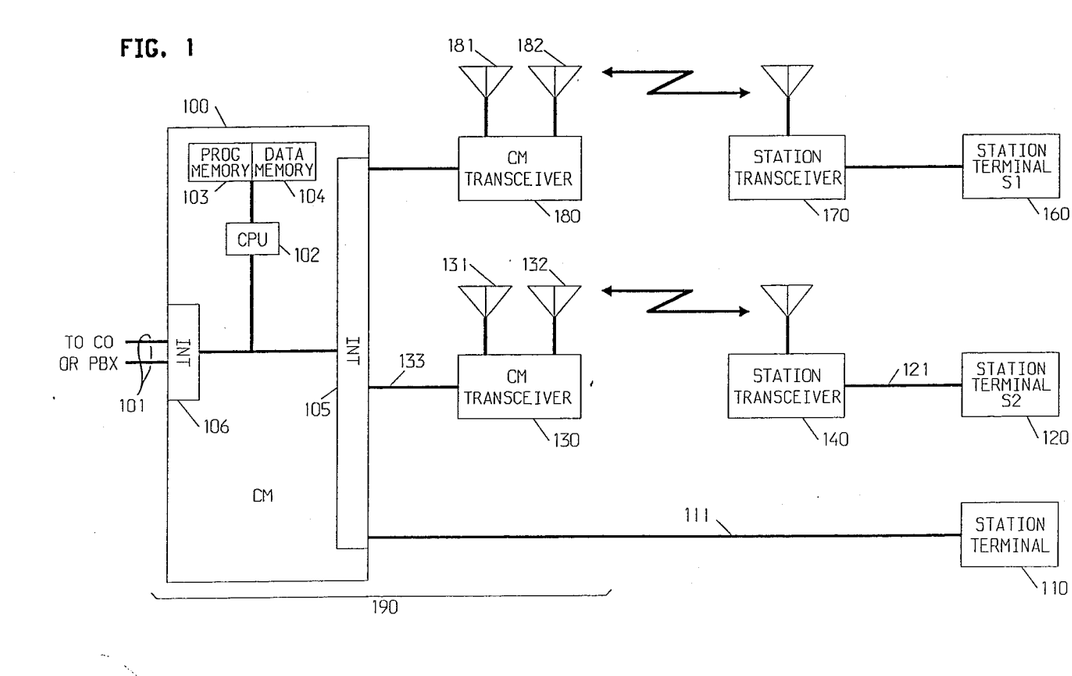
FIG. 1 shows a block diagram of a communication system useful for discussing the operation of the present invention.

Shown in FIG. 1 is a communication system incorporating the present invention. The system includes a master station or control unit 190 including control module (CM) 100 and transceivers 130 and 180. The CM 100 controls communications made via central office (CO) or private branch exchange (PBX) lines 101, and via a wire facility or link 111 to station set 110 and via radio links to slave station sets 120 and 160.

Control module 100 may, illustratively, include a central processor unit (CPU) 102, program memory 103, data memory 104 and interface circuits (105 and 106). Briefly, control module 100 establishes and controls all intercom and CO or PBX line communications. Program memory 103 provides instructions to central processor unit (CPU) 102 for controlling the various operating features and functions of the system. Data memory 104 is utilized by the CPU for storing and accessing data associated with performing the various functions and features programmed in program memory 103. In one embodiment, CPU 102 is a microprocessor, program memory 103 is read-only-memory (ROM) and data memory 104 is random access memory (RAM).

The interface circuits 105 and 106 contain well-known switching, network control, and line circuits required by the system to establish, maintain and terminate communications. Interface circuit 105 also contains circuitry for interfacing control module 100 to transceivers 130 and 180 to provide radio links, respectively, to stations 120 and 160.

One radio link includes two transceivers 130 and 140 for transmitting/receiving data between CM 100 and station set 120. A second radio link uses transceiver 180 and 170 for communications between CM 100 and station set 160. A radio link may be utilized when a wire or optical cable facility is not desired or practical to interconnect CM 100 to a station set. Transceiver 130 may include two antennas 131, 132 that are switch selectable for space diversity and are operated under control of CM transceiver 130.

According to one aspect of the present invention, one of the two antennas (131 or 132, 181 or 182) at each CM 100 transceiver (130, 180, respectively) is selected for radio transmissions based on the quality of the radio transmission signal characteristics between CM 100 and the particular station location. Thus, for example, if a weak signal from transceiver 130 exists when antenna 131 of transceiver 130 is used, transceiver 130 circuitry switches to antenna 132 in an attempt to increase transmission quality. Transceiver 130 would select the antenna which results in the better signal transmission from station set 120. Such a situation may occur because of interference caused by physical objects such as cabinets, doors, etc. or by noise or other interference signals.

A variety of communication systems having different operating characteristics can be accommodated using the arrangement of FIG. 1. In one embodiment, the communication system of FIG. 1 may be used for voice and data signal transmissions. In such an application, while the information signal (voice or data) may require a non-continuous transmission, the control signalling (i.e., on-hook, off-hook button depression signaling, etc.) usually requires a continuous transmission.

Figure 2:
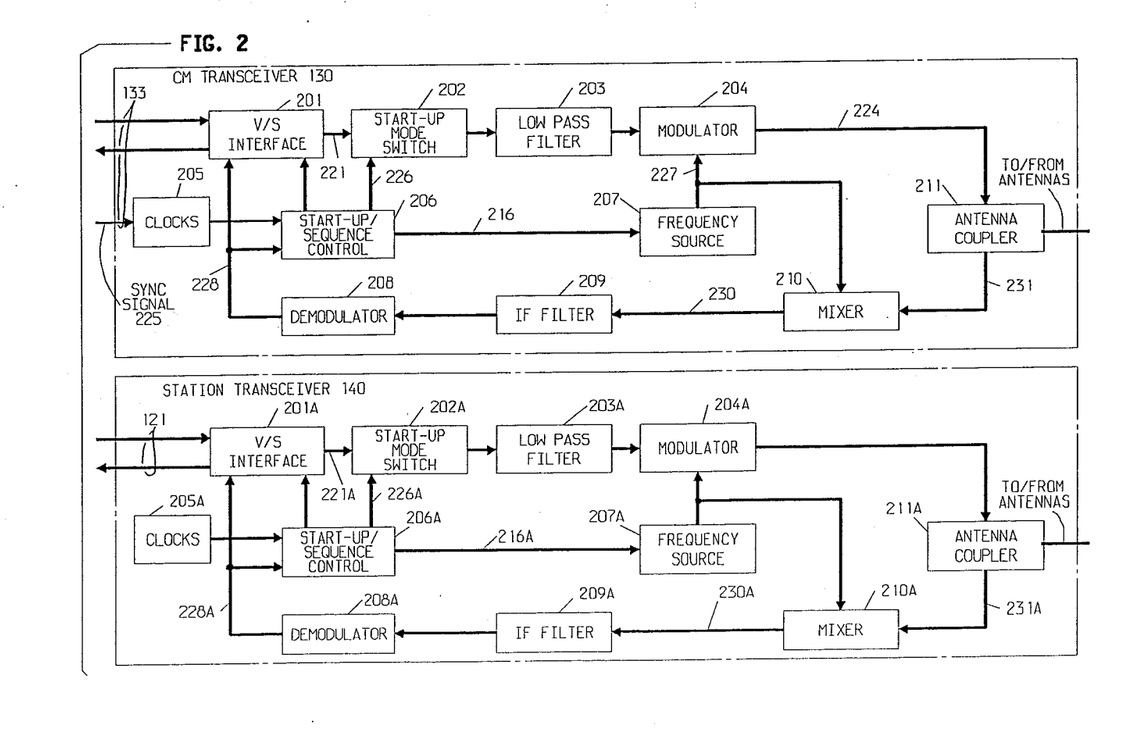
FIG. 2 shows a block diagram of a transceiver circuit used to establish a radio link between the control unit and station locations.

Shown in FIG. 2 is an illustrative block diagram of one embodiment of a control module transceiver (e.g., 130) and a station transceiver (e.g., 140) for use in the system of FIG. 1. Only those circuit blocks useful in understanding the operation of the present invention are described. Obviously, CM 100 may include the CM transceiver apparatus 130 and 180 and the station terminals 120 and 160 may include station transceiver apparatus 170 and 140, respectively. It should also be noted that the basic operation of CM transceiver and of station transceiver are very similar and utilize identical circuit blocks for their implementation. Identical components of both transceivers are identified with the same numbers except that the letter "A" follows numbers of station transceiver 140.

Voice and control information for the remote station are received over facility 133 and interface 201 to produce a narrow baseband signal 221 about 6 kHz in bandwidth. Under normal circumstances, the baseband signal 221 is passed through switch 202 and low pass filter 203 to modulator 204. The baseband signal modulates a carrier frequency 227 that is produced from frequency source 207. The radio frequency (RF) output 224 of modulator 204 is coupled to the antennas 131, 132 through coupler 211.

The radio signal from the remote station transceiver 140 is picked up by the antennas 131, 132 and RF output 231 of the coupler 211 is fed to the mixer 210. The mixer multiplies the received RF signal 231 with the carrier frequency 227 provided by the frequency source 207. The same frequency source 207 is used for both transmitter and receiver to reduce costs. As will be discussed later, the transmitted and received signals differ in frequency by K(K=13 MHz) which is the intermediate frequency, IF. The mixer output 230 is filtered by IF filter 209 and demodulated by demodulator 208 to a baseband signal 228. The baseband signal 228 is fed to the voice/signaling interface 201 where the voice and control information are separated. These signals are passed to the control module 100 in the appropriate form over facility 133. In the few millisecond interval around a frequency transition, the voice and control information are inhibited by the interface 201.

Transceiver sequence controller 206 includes a microprocessor which uses the frequency-hopping sequence to select the carrier frequency for any time slot. The timing clocks 205 and the synchronization signal received every 30 secs from the control module 100 provide timing for the sequence controller 206. The possible frequency-hop sequences are stored in a memory of 206 and one sequence is selected by software or hardware settings. This setting is translated to frequency identifying signals 226 that are passed to the frequency source 227.

Figure 3:
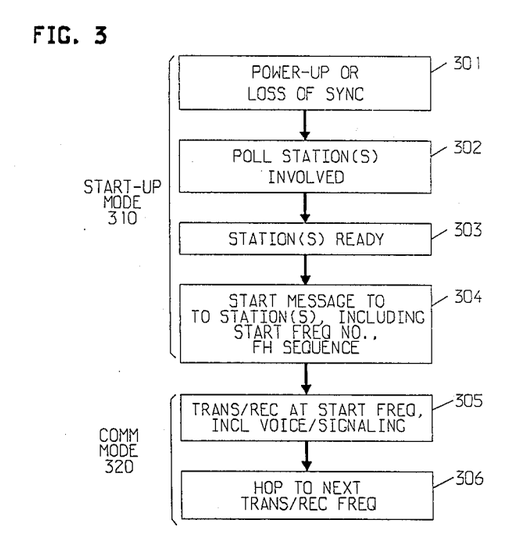
FIG. 3 shows a flow chart of the start-up and communication sequences utilized at the control unit transceiver location.

In accordance with one aspect of the present invention, start-up synchronization is achieved by using a single, predetermined dedicated frequency (unused by any other channel either at start-up or during hopping) for each transmitter. With reference to FIG. 3, a typical startup 310 and communication 320 sequence at a CM transceiver (e.g., 130) is described. All stations are idle on power-up (301) and listen for a poll 302 from the CM transmitter. The poll is a short "are you ready" message at the dedicated frequency, which could be repeated at 1-second intervals while satisfying FCC rules. The stations respond with a ready message 303 on their frequency. The CM then sends a start message 304 on its frequency to each station.

Figure 7:
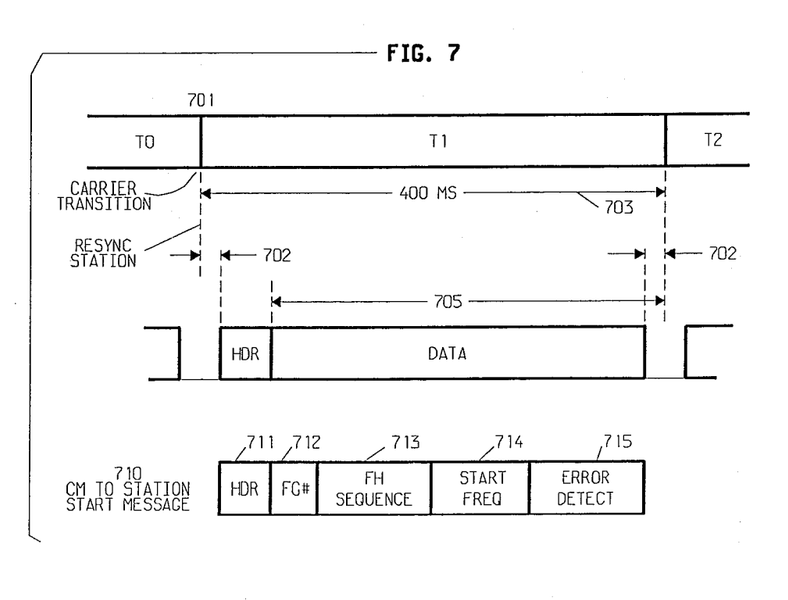
FIG. 7 shows the data format for start messages and system communications.

The start message of step 304 is shown illustratively as 710 of FIG. 7. The start message 710 may include header 711 to sync the station to CM 100, frequency group number 712, FH sequence 713 to be used by that station, starting frequency 714 and an error detection code 715 for detecting error in the start message. The start message 710 is transmitted to each station of the system using an assigned start-up frequency.

Figure 5:
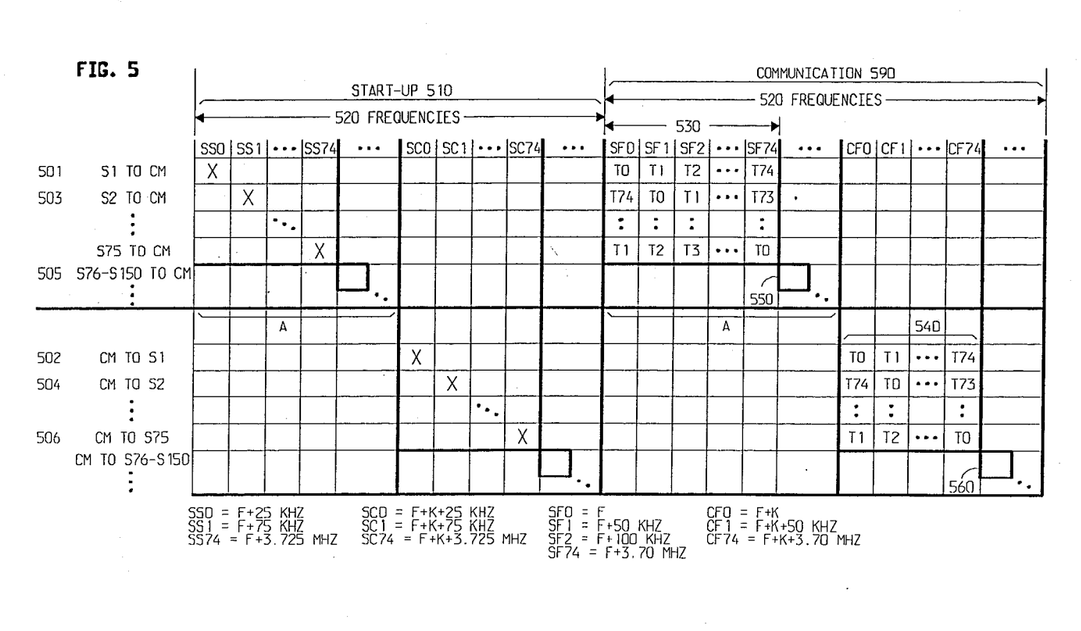
FIG. 5 shows an illustrative algorithm for selecting start-up and communication frequencies for the system of FIG. 1.

The starting frequency 714 may actually be a code which specifies at which frequency in the hop sequence (a number from 0 to 74) a station is to begin transmitting. Thus, with reference to FIG. 5 the start frequency (i.e., at time T0) for station S2 is shown in line 503 as SF1. Note, since more than one frequency-hopping (FH) sequence may be utilized at the control module and station transceivers, the control module specifies the particular FH sequence 713 (or a code representing the FH sequence) to be utilized at each station. With reference to FIG. 5, the FH sequence illustrated is one which sequences through frequencies SF0-SF74. The possible FH sequences can be previously stored at each station (in memory associated with 206A) and identified and established using a FH code 713 specified by control module CM 100. In FIG. 5, while the FH sequence shown for the stations (SF0-SF74) is the same as that shown for CM (CF0-CF74) with a frequency offset K, different FH sequences could be used. A frequency group number 712 can be utilized to identify one of a number of predefined groups of frequencies to be utilized for communication (e.g., 530 of FIG. 5). An example of a frequency-hopping sequence will be described in detail in a later paragraph.

The start message process of step 304 is repeated with each station transceiver which has responded with a ready message. Each station is assigned a unique starting frequency in the hopping sequence at which to begin normal communication with its associated CM transceiver.

With reference to FIG. 2 again, during the start-up mode, voice and signaling are blocked by switch 202 and controller 206 provides the signals 226 to the modulator. Moreover, controller 206 inhibits the output voice and signaling information to facility 133 using the v/s interface 201.

In step 305, sequence controller 206 of each CM transceiver uses the start frequency code 714 and FH sequence 713 of start message 710 to select the proper start frequency and FH sequence for communication with its associated station transceiver. Each CM and station begin normal communication 305 at the assigned start frequency in the hop sequence within a few milliseconds of each other. After 400 ms have elapsed, each CM transceiver hops to the next frequency in the sequence, 306.

If either end of a radio link (e.g., transceivers 130, 140) loses sync or signal, transmission stops and the system goes into the start-up mode for that link. The CM then initiates the start-up sequence 301 to the station involved in the loss of sync or signal (e.g., station 120).

Figure 4:
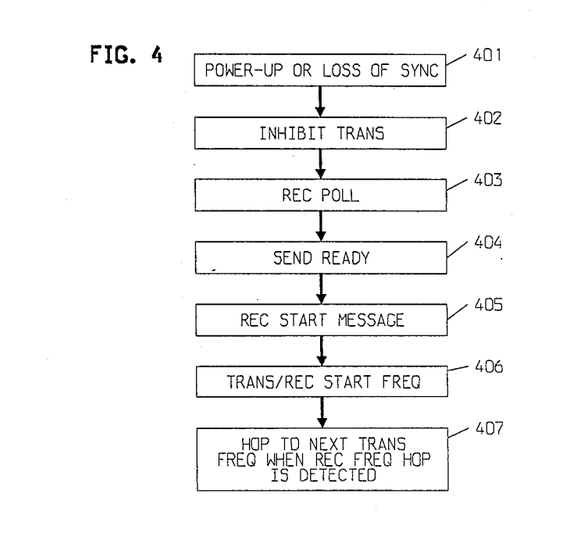
FIG. 4 shows a flow chart of the start-up and communication sequences utilized at the station transceivers.

The following station transceiver description references FIGS. 2, 4 and 7. The station transceiver operation 140 is identical to the control module transceiver 130 except that there is no sync signal 225 from an external source. The station transceiver 140 is a slave to the control module transceiver 130 and receives sync information via the radio channel. On power-up or loss of signal 401, controller 206A inhibits radio transmission 402 and listens for an "are you ready" poll message 403 on the initialization frequency. When the message is received, the controller 206A sends a "ready" message 404. The "start" message 710 received from the control module transceiver 130 in step 405 is used by sequence controller 206A to identify the start frequency 714 for transmissions, the frequency-hopping sequence 713, and the frequency group 712.

At the station transceiver, the memory associated with sequence controller 206A stores a plurality of frequency groups and frequency-hopping patterns. The start message 710 is decoded by the sequence controller 206A and used to identify the particular frequency group and frequency-hopping pattern which has been selected by CM 100 for use at that station. In accordance with the present invention, sequence controller 206A uses the start message 710 and a stored algorithm to identify the start frequency for receptions from the CM transceiver 130 and the frequency-hopping pattern to be used for receptions. In the example to be discussed in a later paragraph, the algorithm used to identify the start frequency for receptions merely adds K MHz to the start frequency used for transmissions (as identified by 714). The algorithm also specifies that the frequency-hopping sequence (as identified by 713) for both receptions and transmissions should be the same.

Returning to FIG. 4, in step 406 normal transmission and reception begin at the respective start frequencies. Subsequent frequency hops 407 occur when frequency hops are detected in the received radio signal and synchronism is maintained. One way to accurately tie the frequency transitions at station transceiver 140 is to use the control signals in the received signal from the CM transceiver 130. This method will be described in a later paragraph.

The transceiver modules, illustratively 130 and 140, may be well-known circuits arranged to communicate analog or digital signals, respectively, over facilities 133 and 121 with, respectively, interface circuit 105 of CM 100 and station 120.

In accordance with the present invention, each radio link may use some or all of the frequency channels of the 902–928 MHz band for the transmission of analog or digital information using frequency-hopping techniques. The baseband information consists of an analog voice channel from 0.3 to 3 kHz and a 1–2 kHz control channel located above 3 kHz that contains the digital control information. The exact location and width of the control channel depends upon the economics of the various filtering possibilities. This combined signal must have a bandwidth of <25 kHz after modulation to the 915 MHz region to satisfy FCC rules. Because little bandwidth is available for a control channel, there may be delays in a station radio frequency response time vis-a-vis cable. For example, the worst-case delay from button press to response may be longer in the case of a key telephone system. The use of a higher bandwidth control channel would reduce response time at the cost of more elaborate and costly filtering.

The baseband signal (voice plus control signals) is modulated on a carrier whose frequency is switched periodically in what is called a frequency-hopping mode of transmission. With frequency-hopping transmission, a given frequency is used for 400 ms (or less) and then the transmitter switches to another frequency for the next 400 ms. As specified by the FCC, 75 different frequencies spaced by at least 25 kHz must be used every 30 seconds. A given sequence of hopping frequencies must last at least 30 seconds but then the sequence can be repeated. There are 1,040 frequency channels, each 25 kHz wide, between 902 and 928 MHz. The purpose of frequency-hopped channels is to allow many users to have random access to the frequency channels without any coordination among them. The theory of frequency hopping is that if the frequency-hopping sequence is random, there is a low probability that more than one transmitter is using the same frequency at the same time, given a lightly loaded system. Obviously, with enough simultaneous users and no coordination, there will be overlap of frequency usage and communications will deteriorate because of interference.

For a small centralized communication system (e.g., FIG. 1), overlapping frequencies can be avoided with some coordination. If we assume that each transmitter needs 76 different frequencies (1 for start-up and 75 for a 30-second transmission cycle), a system can have six simultaneous users with no common frequencies and no chance for frequency clash. The six duplex communication links use 12 transmitters, each requiring 76 different frequencies which total 912 frequency channels (out of the total of 1,040 available channels). While six separate duplex channels should be sufficient for many arrangements, a problem exists to satisfy the needs of larger communication systems. Moreover, the potential exists for interference when multiple small communication systems operate in a close geographic area.

This problem is solved by the present invention which synchronizes the frequency-hopping channels of all stations of the system. The synchronization takes the form of a master/slave message or signal between CM 100 and each station set (120, 160). The transceivers at CM 100 are the masters and those at the stations are the slaves. The message insures that all CM transmitters are locked to a system clock such that all 30-second frequency-hopping sequences are started simultaneously. Similarly, since all station transmitters are locked to their associated CM 100 transmitter's cycle, all 30- second frequency-hopping sequences in the system start together (within the transmission delays of the system-a few ms). Consequently, all frequency sequences can be chosen so that at any given time every transmitter is sending a different frequency.

FIG. 5 illustrates one embodiment of the invention in which each transmitter-i.e., one at CM 100 (e.g., 502) and one at each station set (e.g., 501) for each 2-way radio link-is assigned one unique frequency for start-up handshaking (i.e., SC0 and SS0, respectively) and one unique starting frequency for communications (i.e., CF0 and SF0, respectively, at time T0). Thus, 1,040 frequency channels provide for 260 simultaneous users. Half the available frequencies (i.e., a total of 520) are used for start-up (see 510) and half for communication frequency sequencing (see 590). Each user during each time interval or time slot (T0–T74) requires a unique pair of frequencies for transmit and receive channels. Thus, during any one time slot, there can never be more than one transmitter using a given frequency. In each 400-ms timeslot (T0–T74), the 520 frequencies are permuted among the CM and station transmitters in accordance with the FCC constraints. The disclosed method of assigning different frequencies to different transmitters during each time slot T0–T74 and synchronizing the frequency hopping prevents frequency interference.

Figure 6:
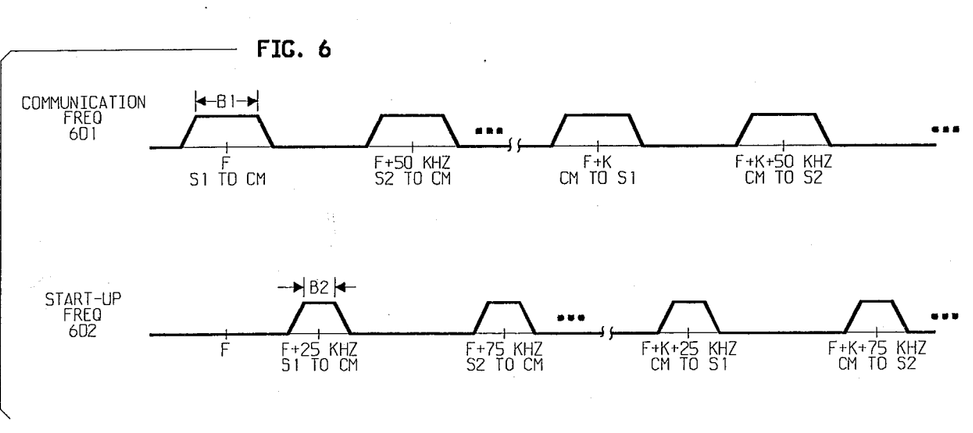
FIG. 6 shows an illustrative frequency allocation format for use in the present invention.

Shown in FIG. 6 is an illustrative example of an allocation of frequencies for both the start-up 602 and active communication 601 phases of operation. The frequency F is approximately 902.0125 MHz. Note, according to one aspect of the present invention, the active communication frequencies are interleaved with the start-up frequencies to simplify the filter designs. The bandwidth B1 of the active communication channels 601 may be approximately 25 kHz to accommodate a modulated 6 kHz signal needed for voice (3 kHz) and control channel signaling (1–2.0 kHz). The narrow bandwidth B2 for the start-up channels 602 may be about 10 kHz, providing a >1K-bit per second data rate during start-up.

The parameters of a start-up protocol may be chosen so that synchronization can be achieved quickly (within a few seconds) rather than waiting for the beginning of a new 30-second cycle. Note that the protocol messages are very narrow bandwidth signals 602 so the likelihood of interference with adjacent hopping frequencies should be very low. This is shown in FIG. 6 which illustrates that the bandwidth B2 for the start-up frequencies 602 is less than the bandwidth B1 of the communication frequencies 601.

With joint reference to the tables of FIG. 5 and FIG. 6, an illustrative frequency allocation algorithm and the resulting frequency-hopping sequence is described. In the disclosed algorithm, each station (e.g., S1–S75) is assigned to a group of stations which utilize a first group of frequencies for receiving 540 and a second group of frequencies for transmitting 530. Each station uses the frequency group number 712 in start message 710 to select the group. Thus, for example, the frequency group number 712 may select group 530 for station transmissions and group 540 for receptions from the control unit.

The start message 710 is also used to identify the start frequency number 714. The start frequency number 714 could be a code for identifying one of the frequencies of groups 530 and 540 or could be the actual encoded frequency. As previously noted, each station sequence controller 206A may utilize an algorithm to determine the receive start frequency and receive frequency group from the transmit start frequency and transmit frequency group (i.e., by adding K to the transmit start frequency to define the receive start frequency).

Each station transceiver is programmed to sequentially and synchronously step (i.e., frequency-hop) to the next communication frequency following the identified frequency-hopping sequence 713, beginning with the start frequency 714 identified in start message 710. Thus, for example, station S1 at time slot T0 receives at frequency CF0 and transmits at frequency SF0. Thereafter station S1 would synchronously hop to frequency CF1 and SF1 at time slot T1 and so forth. When frequency SF74 is reached, station S1 recycles back to SF0 on the next time slot. Similarly, the associated transceiver at CM 100 is preprogrammed to step sequentially from a starting frequency CF0 through CF74. Note there are a total of 520 start-up frequencies (510) and 520 communication frequencies (590). While, as previously discussed, the start-up frequencies 510 are interleaved with the communication frequencies 590, other frequency assignments are contemplated within the scope of the present invention. Thus, for example, one pair of start-up frequencies (e.g., SS0 and SC0) could be encoded and used for all start message transmissions to and responses from stations. However, this would slow the start-up procedure for the system.

In the following example, each CM transceiver/station transceiver pair (e.g., 130 and 140) has corresponding start-up and communication frequencies separated by a fixed frequency offset K (13 MHz) which could serve as the intermediate frequency (IF). Thus, for example, SC0 is offset from SS0 and CF0 is offset from SF0 by K. Moreover, the described frequency-hopping (FH) sequence at CM 100 transceiver 130 (CF0–CF74) is identical to that of the station transceiver 140 (SF0–SF74) with a frequency offset of K, as shown in FIG. 5. The use of identical sequences means that one frequency source (e.g., 207) serves both modulator (e.g., 204) and mixer (e.g., 210) to reduce costs.

The following paragraphs describe a frequency-hopping technique according to the present invention for a system, such as shown in FIG. 1, having two radio frequency coupled station sets S1 (120) and S2 (160). The station start-up frequency assigned to the station set S1 to CM 100 channel is designated SS0 and has a frequency of F+25 kHz, as shown in 501. Similarly, for station S2 and CM 100 the start frequency SS1 and SC1, respectively, are shown in lines 503 and 504. During the start-up mode, station S1 is assigned a start frequency SF0 and station S2 the start frequency SF1.

At the conclusion of the start-up operation, transceiver 140 of station S1 uses the assigned frequency SF0 and station S2 the assigned frequency SF1 during the first 400-millisecond (ms) time interval T0. In accordance with the disclosed illustrative algorithm during the second time interval T1, station S1 switches to frequency SF1(F+50 kHz) and station S2 synchronously switches to frequency SF2(F+100 kHz). Thereafter stations S1 and S2 step along in 50 kHz frequency increments for each time slot interval (T2 through T74) until on the 75th time interval (T74) station S1 utilizes SF74 equal to F+3.70 MHz and station S2 utilizes SF0. The method of synchronizing the switching of time intervals will be discussed in a later paragraph.

With reference to 502, control module 100 similarly causes its transceiver 130 to start, illustratively, at frequency CF0 equal to F+K at time T0 and to step-along in 50 kHz intervals until it reaches $F+K+3.70$ MHz at time interval T74 (interval 75). At the transition to the next time interval, the frequency oscillator at transceiver 130 is reset to frequency CF0. Thus, transceiver 140 at station 120 and transceiver 130 at CM 100 communicate with each other using different frequencies without ever overlapping frequencies during the 75 time intervals. Similarly, transceiver 170 at station S2 and transceiver 180 of CM 100 are arranged to start (time interval T0) at frequencies SF1 equal to $F+50$ kHz and CF1 equal to $F+K+50$ kHz, respectively, and step along in 50 kHz intervals. Thus, transceiver 180 starts at frequency CF1 equal to $F+K+50$ kHz and steps along until frequency CF74 equal to $F+K+3.70$ MHz is reached during time interval T73. On the next transition to time interval T74, the frequency clock is reset to SF0 equal to $F+K$ MHz. Again, notice that, because of the synchronous switching, stations S1, S2 and transceivers 130 and 180 never overlap frequencies with each other.

The above illustrated frequency allocation algorithm can accommodate 75 facilities within the frequency groups 530 and 540 without frequency overlap. If more than 75 radio links are required, then a second group of 75 frequencies can be assigned to station (e.g., 550) and CM transceivers (e.g., 560). The frequencies for group 550 would extend from $F+3.75$ MHz through $F+7.45$ MHz in 50 kHz steps. The frequencies for group 560 would extend from $F+K+3.75$ MHz through $F+K+7.45$ MHz in 50 kHz steps. This process can continue until six groups of 75 links each or a total of 450 radio links. The last 70 frequencies (451 through 520) cannot be utilized in the same manner since it would violate the FCC requirements of a minimum of 75 frequency hopping frequencies.

It should be obvious that other algorithms for allocation of hopping frequencies may be utilized without deviation from the present invention. Thus, for example, each station can be made to step along in a 50 kHz increment from frequency F until frequency $F+12.950$ MHz is reached at which time the frequency returns to frequency F at the next time interval. Such an arrangement would spread the transmissions from any station over a wider frequency spectrum. The resulting diversity may offer advantages in certain systems.

The selection of an algorithm for selecting hopping frequency may also consider that the frequency separation between a transmit and receive signal to any station should be different from the 13 MHz(K) utilized in the illustrative algorithm. Moreover, to more evenly distribute the frequencies across the band, stations of a system may be assigned frequencies which are separated by much more than the 50 kHz utilized in the illustrative example. Thus, it is contemplated that any of a variety of algorithms may be utilized for allocating hopping frequencies and/or startup frequencies.

Additionally, depending upon the requirements of the communication system, the start-up messages for each station may be multiplexed together and thereby utilize less than two starting frequencies (510) for each station-to-control module link. The result is that more frequency channels would be available for use as communication channels (590).

In accordance with another aspect of the present invention, the system may need to use space diversity to combat multipath transmission. In addition, the demodulation of the frequency-hopped carrier may be very noisy at the transitions of the carrier. That means that voice may have to be muted for a few ms every 400 ms (not perceptible) and data transmission may be confined to the nontransition interval. This is shown in FIG. 7 which illustrates carrier transition time 701 and muting interval 702 at each end of the 400-ms time interval 703. Each station transceiver (e.g., 140) detects a header 704 to determine the start of each time interval. The muting interval 702 takes care of transition errors, such as those caused by transmission delays between the CM 100 and station terminals. The time interval 705 following the header 704 can be used to time the frequency transitions at the station transceiver 130 to maintain system synchronization.

What has been described is merely illustrative of the application of the principles of the present invention. Other methods and circuits can be implemented by those skilled in the art without departing from the spirit and scope of the present invention.

What is claimed is:

1. A radio communication system including a control unit which transmits information to and receives information from each of a plurality of stations using frequencies selected from a group of frequencies using a frequency-hopping sequence, said system comprising at said control unit means for transmitting to each of said plurality of stations a first control message identifying both a first unique starting frequency from a first frequency group at which to start receiving from said control unit and a second unique starting frequency from said first frequency group at which to start transmitting to said control unit and further identifying at each of said plurality of stations the same frequency-hopping sequence to ensure that no two stations of said plurality of stations use the same frequency at the same time for transmissions to and receptions from said control unit, at each of said plurality of stations means responsive to said control message for identifying the second and first unique starting frequencies, respectively, for transmitting and receiving at each of said plurality of stations, and for establishing said frequency-hopping sequence to select transmission and reception frequencies thereat.

2. The radio communication system of claim 1 wherein said control unit uses a first frequency-hopping sequence for transmission to each of said plurality of stations and each of said plurality of stations uses a second frequency-hopping sequence for transmissions to said control unit.

3. The radio communication system of claim 1 wherein said first frequency group includes a second frequency group and a third frequency group and wherein said control unit transmits using frequencies selected from said second frequency group and said plurality of stations transmits using frequencies selected from said third frequency group.

4. The radio communication system of claim 1 wherein said first control message is sent to each of said plurality of stations using a different first preassigned frequency not selected from said first frequency group.

5. The radio communication system of claim 4 further comprising at each of said plurality of stations means for transmitting a second control message to said control unit using a second preassigned frequency not selected from said first frequency group, and at said control unit means for receiving said second control message from each of said plurality of stations.

6. The radio communication system of claim 5 wherein said first control message sent from said control unit to each of said plurality of stations uses a different preassigned frequency selected from a second frequency group which is not included in said first frequency group and wherein each said second control message sent from each of said plurality of stations to said control unit uses a different preassigned frequency selected from said second frequency group.

7. The radio communication system of claim 6 wherein the frequencies of said second frequency group are frequency interleaved with the frequencies of said first frequency group.

8. The radio communication system of claim 1 further comprising at each of said plurality of stations means for terminating transmission therefrom when no signal has been received for a first predetermined time period and at said control unit means for terminating transmission therefrom when no signal has been received for a second predetermined time period.

9. The radio communication system of claim 1 wherein said control message is transmitted in response to one or more status conditions selected from the group including a power-up and a loss of sync condition detected at said control unit.

10. A control unit for use in a radio communication system including means for transmitting information to and receiving information from each of a plurality of stations using frequencies selected from a first group of frequencies using a frequency-hopping sequence, said control unit further comprising means for transmitting to each of said plurality of stations a control message identifying both a first unique starting frequency from said first frequency group at which to start receiving from said control unit and a second unique starting frequency from said first frequency group at which to start transmitting to said control unit and further identifying at each of said plurality of stations the same frequency-hopping sequence to ensure that no two stations of said plurality of stations use the same frequency at the same time for transmissions to and receptions from said control unit.

11. The control unit of claim 10 wherein said control message is sent to each of said plurality of stations using unique preassigned frequencies selected from a second group of frequencies which are not part of said first frequency group and receives a second control message from each of said plurality of stations using unique preassigned frequencies selected from said second frequency group.

12. The control unit of claim 11 wherein the frequencies of said first frequency group are interleaved with the frequencies of said second frequency group.

13. The control unit of claim 10 wherein said control message is transmitted in response to one or more status conditions including a powerup or a loss of sync condition detected at said control unit.

14. A station for use in a radio communication system including means for receiving information from and transmitting information to a control unit using frequencies selected from a group of frequencies using a frequency-hopping sequence, said station further comprising means responsive to a first control message received from said control unit for identifying a first and a second unique starting frequency, respectively, for transmitting and receiving, and for establishing said frequency-hopping sequence to select transmission and reception frequencies for said station from a group of frequencies.

15. The station of claim 14 further comprising means for receiving said first control message at a preassigned first frequency not selected from said frequency group.

16. The station of claim 14 further comprising means for transmitting a second control message to said control unit at a second preassigned frequency not selected from said frequency group in response to a received control message from said control unit.

17. The station of claim 14 further comprising means for detecting a transition time in the frequency-hopping sequence of received frequencies and synchronizing the frequency-hopping of station transmission frequencies to said transition time.

* * * * *